United States Patent
Schumann et al.

[11] Patent Number: 5,858,039
[45] Date of Patent: Jan. 12, 1999

[54] CYLINDRICAL STAR-SHAPED FILTER BAG AND SUPPORT CAGE

[76] Inventors: Gebhard F. L. Schumann; Klaus R. K. Schumann, both of Unterbaselwag 43, 79576 Weil am Rhein, Germany

[21] Appl. No.: 667,462

[22] Filed: Jun. 21, 1996

Related U.S. Application Data

[63] Continuation of Ser. No. 308,402, Sep. 7, 1994, abandoned.

[30] Foreign Application Priority Data

Jun. 16, 1994 [DE] Germany .............................. 9409704 U

[51] Int. Cl.$^6$ .................................................. B01D 46/08
[52] U.S. Cl. ................................ 55/378; 55/379; 55/492
[58] Field of Search ............................ 55/361, 378, 379, 55/380, 529, 492, 490, 498, 521; 95/521, 273

[56] References Cited

U.S. PATENT DOCUMENTS

| | | | |
|---|---|---|---|
| 2,774,443 | 12/1956 | Slayter | 55/379 |
| 3,853,509 | 12/1974 | Leliaert | 55/379 |
| 4,259,095 | 3/1981 | Johnson, Jr. | 55/379 |
| 4,290,790 | 9/1981 | Okubo | 55/379 |

FOREIGN PATENT DOCUMENTS

| | | | |
|---|---|---|---|
| 3637516 | 4/1988 | Germany | 55/379 |
| 20176 | 12/1912 | United Kingdom | 55/379 |

*Primary Examiner*—Duane S. Smith
*Attorney, Agent, or Firm*—Kane, Dalsimer, Sullivan, Kurucz, Levy, Eisele and Richard, LLP

[57] ABSTRACT

The apparatus is a filter element with an inner star-shaped support cage and a star-shaped filter fabric being held in a star shape only by circumferential outer bands. The inner star-shaped cage has support elements with radially outwardly extending star rays which are affixed to pairs of laterally offset longitudinally extending wires.

5 Claims, 5 Drawing Sheets

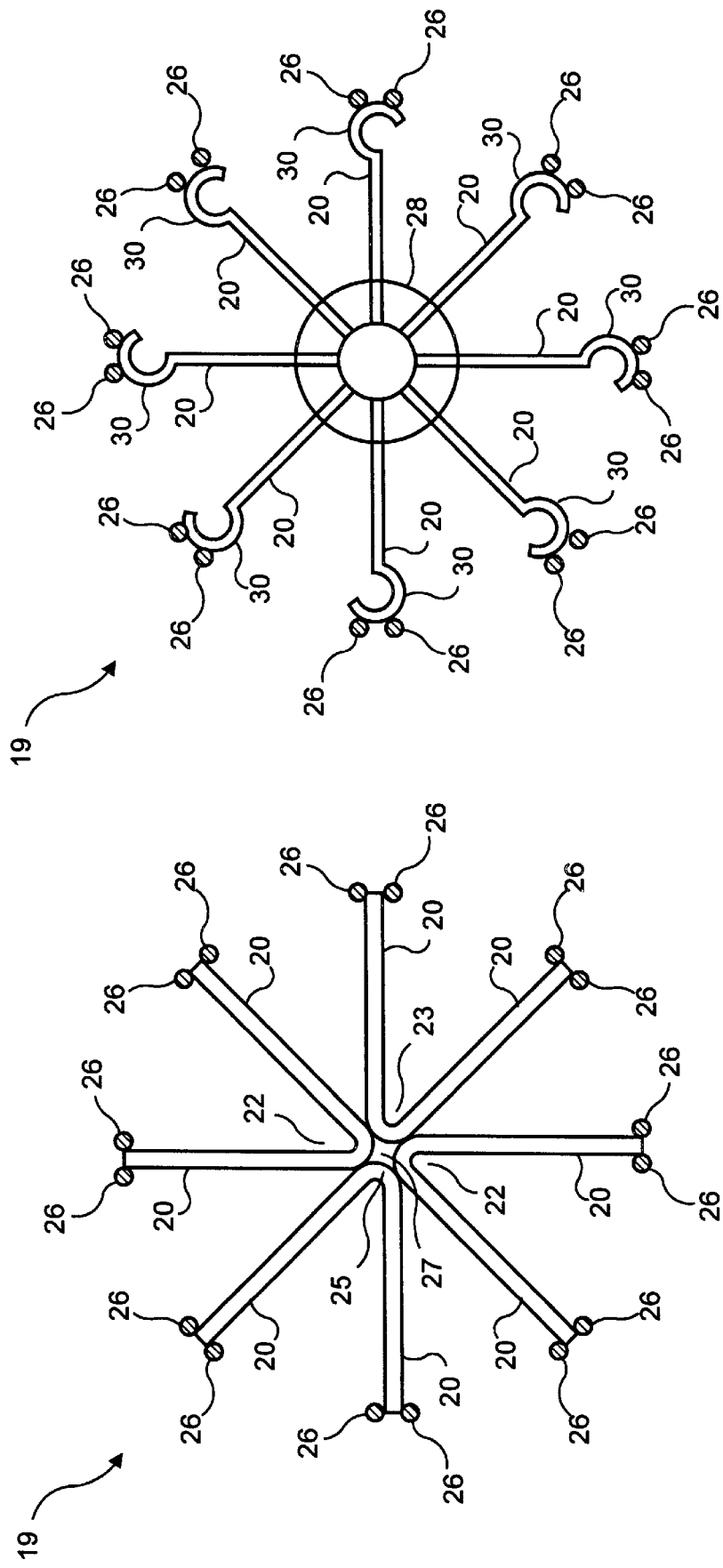

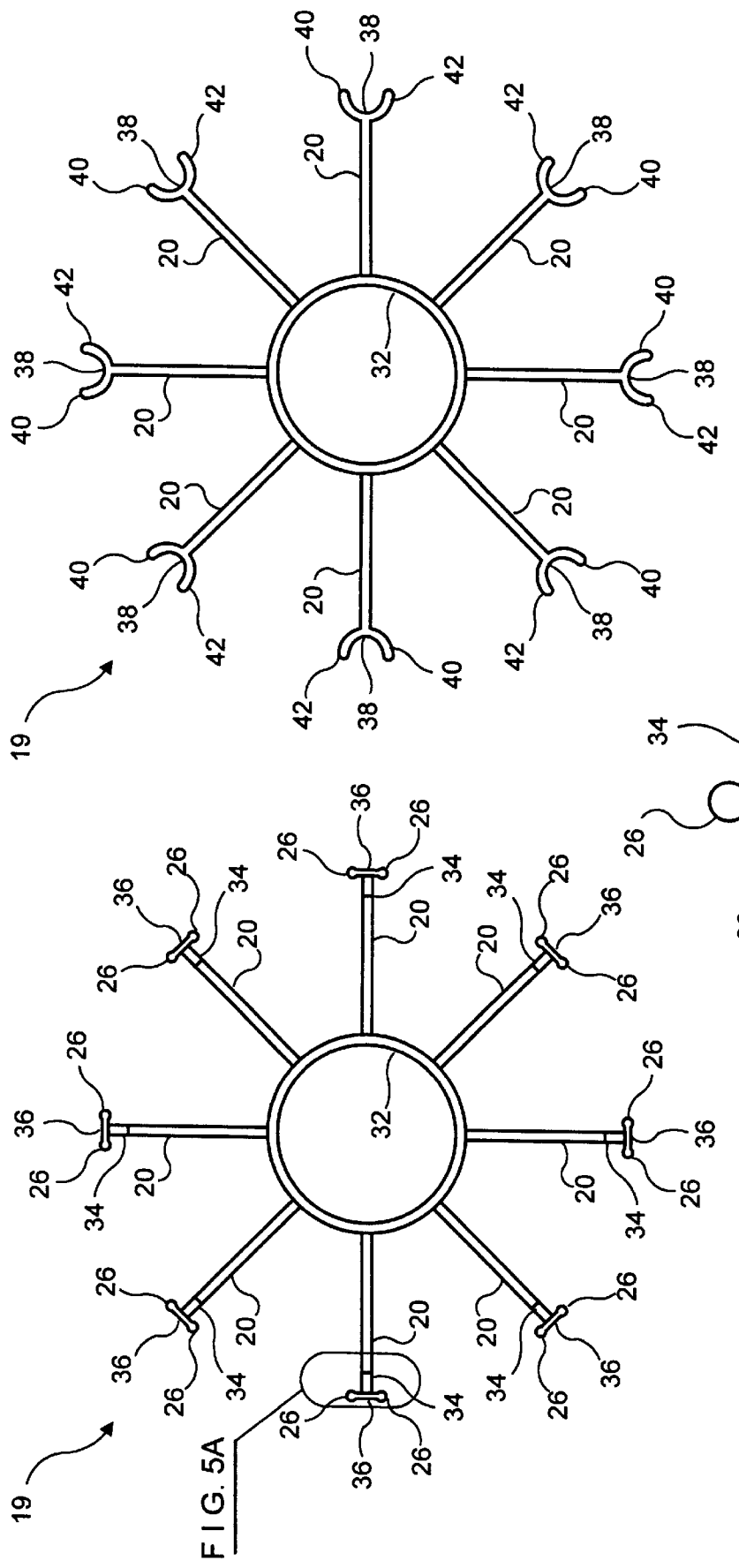

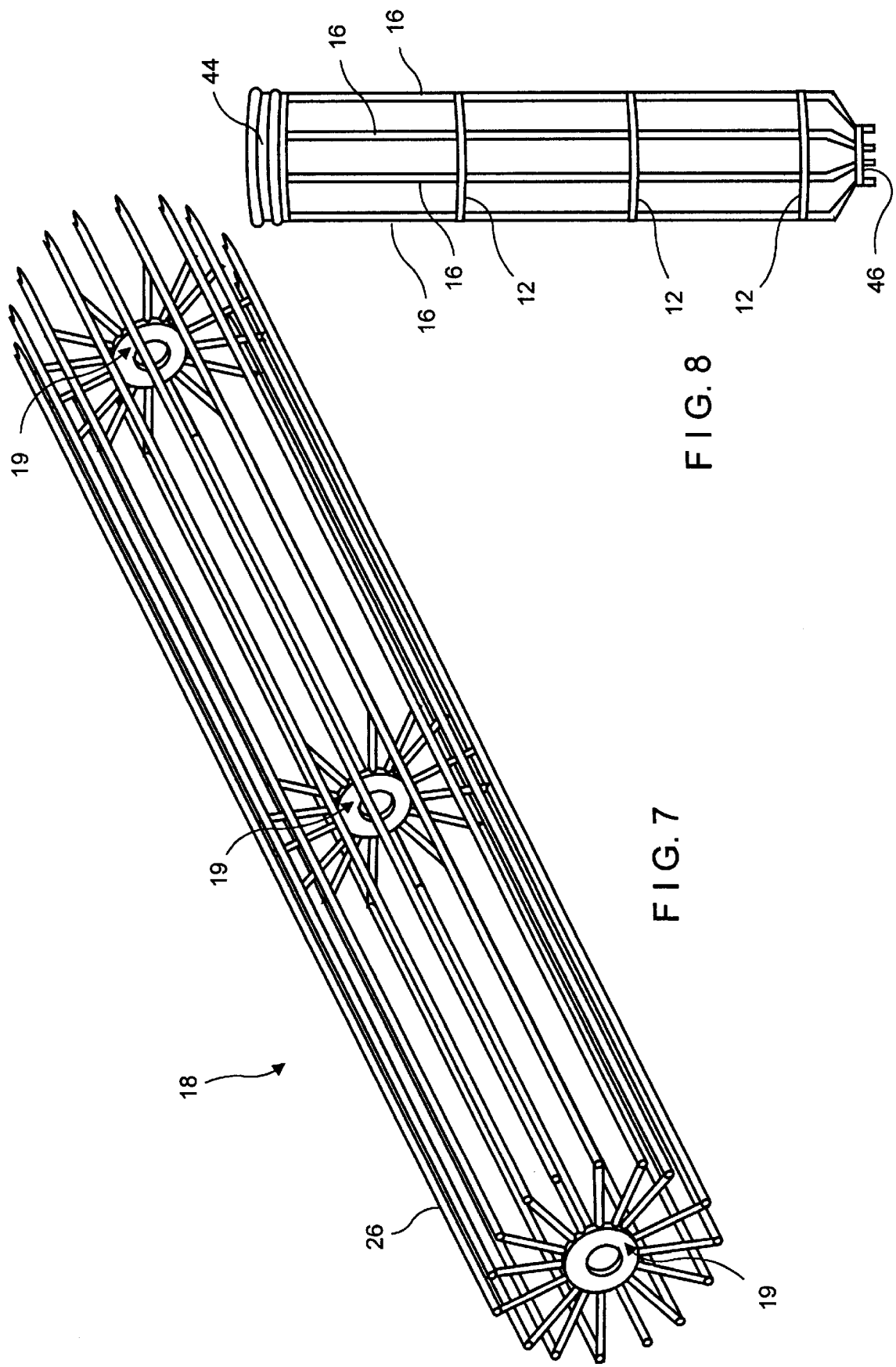

CYLINDRICAL STAR-SHAPED FILTER BAG AND SUPPORT CAGE

This application is a continuation of application Ser. No. 08/308,402 filed on Sep. 7, 1994, now abandoned, the disclosure of which is incorporated by reference.

BACKGROUND OF THE INVENTION

1. Field of the Invention

The present invention relates to a filter element composed of a filter bag and a single support cage. More specifically, this invention relates to pulse-jet filter elements, wherein air is directed in a reverse direction to clean the filter elements.

The present invention also relates to star-shaped filter cartridges which include filtration material wound around a perforated inner cylinder.

2. Description of the Prior Art

In the prior art, pulse-jet filter elements have round tubular filter bags, mounted onto tubular wire cages, which have by snap-ring fittings in the housing, where air is drawn through the filter bags during the filtering process and reverse direction air flow through the bags is used to clean the filter bags.

The filter bags are closed on the bottom and open on the top. The dust laden air to be filtered is drawn through the filter bag from outside of the bag and the dust particles are retained on the surface of the filter bag. Air-to-cloth ratio, dust retention and cake-release of a given filter material and the filtration surface determine the efficiency of a fabric-filter pulse-jet bag housing. In this regard, prior art pulse-jet filter bags have been limited by the circumference of the filter bags. Increasing the size of the filter housing in order to increase the circumference of the filter bag and thereby increase the efficiency of the filter typically would result in an expensive and unwieldy filter housing.

Similarly, cartridge filters have the disadvantage of being limited in length, typically not exceeding two meters. They also have limited temperature resistance and a flat folded portion at the ends of the pleated regions which reduces the effective filter area when air is forced through the filter cartridges at high differential pressure.

U.S. Pat. No. 4,259,095 to Johnson has a cage support with a star-like construction, but is constructed to hold a tubular filter bag and was designed to improve the cleaning cycle of pulse-jet filter bags by diffusing the reverse-direction air more efficiently via perforations in the inner tube of the cage support. This inner tube includes peripheral portions extending outwardly beyond other points of the tube for engaging and holding the surrounding filter bag. However, the peripheral portions hold a tubular bag not a star-shaped bag. The inner tube of the cage prevents the cage from being a star-shaped cage to hold a star-shaped bag.

Similarly, U.S. Pat. No. 3,853,509 to Leliaert teaches a tubular filter bag which is held in a star-shape by inner and outer cages. This double cage construction is expensive and time-consuming both in manufacture and installation. This double cage construction is therefore not economically feasible. Additionally, where the filter fabric rests on the tips of the star-rays of the inner cage of the double cage support system of the Leliaert reference forms a point of abrasion to the filtration fabric. This abrasion is caused by the added friction of the outer cage.

Similarly, conical tubes with flanged corners are disclosed in U.S. Pat. No. 2,774,443 to Slayter and British Patent No. 20,176 to Sokal. However, flanges are not filtration surfaces and do not increase the filtration surface of the filter bags.

Other prior art pulse-jet filter elements have a metal support cage to hold them open during the filtration cycle. The cage comprises longitudinal wires or rods welded to wire rings circumferentially spaced along the length of the wires. These cages, possibly as long as eight meters in length, a length which is frequently necessary for the filtration of large volumes of industrial gas, but the long length is disadvantageous during the transportation and installation of filter elements, particularly if there is limited space near the cell plate of the filter housing.

OBJECTS AND SUMMARY OF THE INVENTION

The present invention is a star-formed filter element. It has the advantage of either taking the same filter surface of conventional cylindrical filter bags (normally pulse-jet filter bags) and reducing the diameter (thus reducing the spaced need for filter elements) or taking the diameter of standard filter bags and increasing the filter surface available. The filter elements can be made out of any type of filter material, and can be used from normal temperature conditions going up to 280° C. or 530° F.

The filter bags are open on the top and closed on the bottom. The bottom can be closed in various ways —tied-off, with metal clamps, with folds sewn flat, inserting a bottom circle or other methods. The stop of the filter bag is not star-shaped but cylindrical, meaning that it is finished off, as desired, as conventional filter elements, with snap band rings with double-beaded gasketing, felt strips, rings or other conventional installation methods. The open top can therefore be made to fit any standard cell plate and gasketing size. The filter material applicable is many fold and may be needled felt, non-woven, woven material, warp-knitted, circular-knitted fabric also out of micro-filament yarn, fiber-glass and/or metal fabrics. The length and diameter of the filter bag is variable in accordance with the needs in line with the filter housing dimensions.

The filter bags have bands to hold the star-shape stable and to prevent the filter bag from expanding too much during the pulse-jet or reverse air cleaning cycle. The bands are placed around the filter bag and calculated intervals along the length of the bag. The smaller circumference of the band is co-related to the large circumference of the filter element by setting points at regular lengths on both the band as well as the bag. The points are joined together by sewing, gluing, welding or other techniques.

The filter bag has an inside support construction or cage. This cage can be made out of steel, stainless steel, aluminum or plastic. The cage has rods or wires running parallel down the length of the cage to form the point of each star, these rods, two for each ray, are connected to center star shapes, which are placed at regular intervals down the length of the cage. The rods, forming the tips of the rays, are set one each side of the star ray close to the point. There is space between them that prevents a sharp star point, in order to reduce mechanical abrasion to the filter material. The filter material touches the cage only along the edges of these to rods, which also minimizes mechanical damage and allows the filter material to be used fully as a filtration surface. The support cages can also be constructed of extruded aluminum or plastic profile. The profiles have an indentation at each star point, again so that the filter material is held on two round edges instead of having a sharp point. The cages can also be made out of welded wire or out of a star pipe construction.

The filter cages can be mounted as a single piece or can be assembled.

BRIEF DESCRIPTION OF THE DRAWING

Further objects and advantages of the invention will become apparent from the following description and claims, and from the accompanying drawing, wherein:

FIGS. 3–6 are cross-sectional views of various embodiments of the star cage of the present invention, with FIG. 5 including an insert which illustrates an enlarged cross-sectional view of the T-pin or peg of the star-ray of the cage of the present invention.

FIG. 7 is a front perspective view of a star cage of the present invention.

FIG. 8 is a front plan view of the star cage and star filter of the present invention.

DETAILED DESCRIPTION OF THE PREFERRED EMBODIMENT

Figure 1:
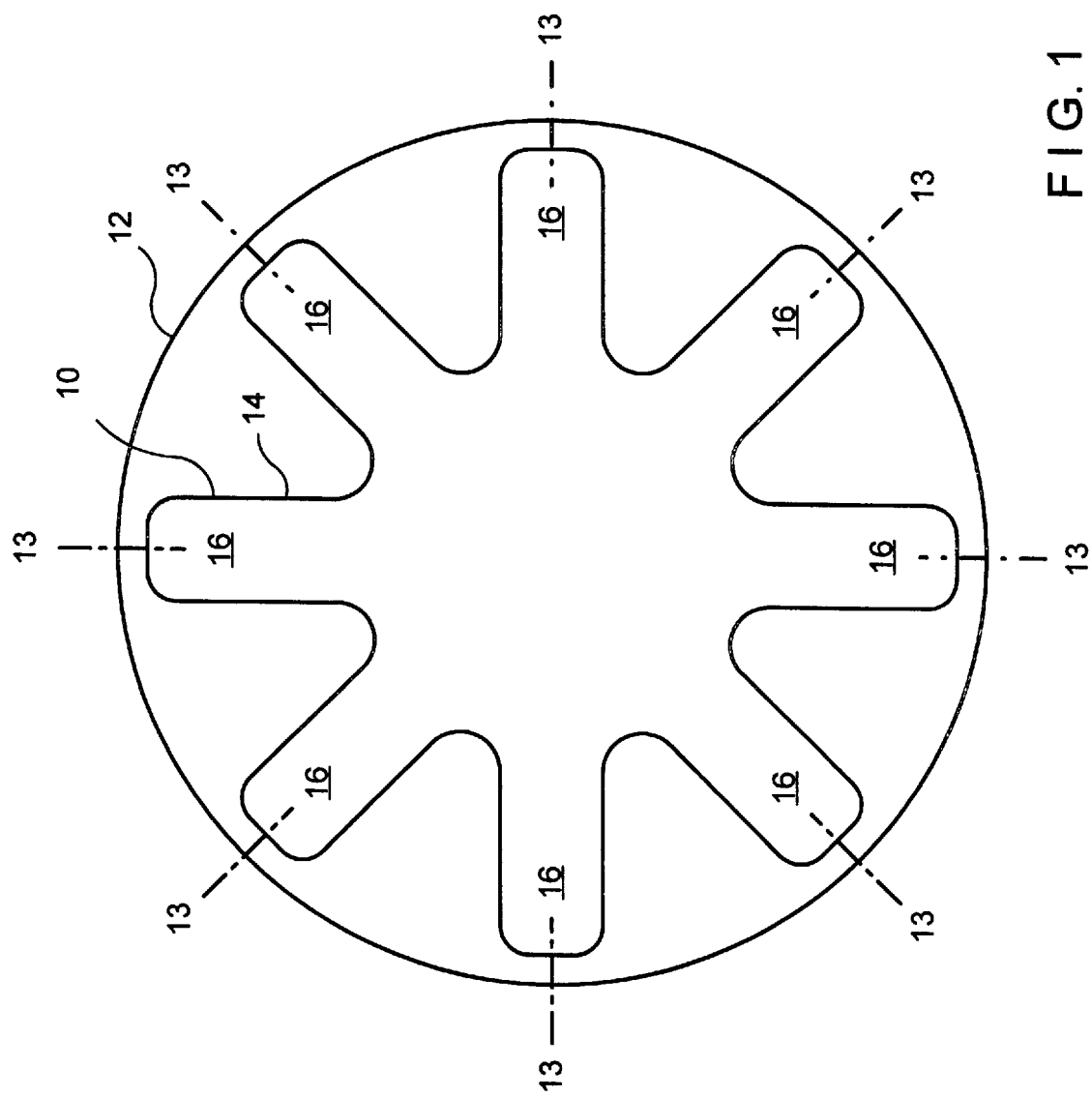
FIG. 1 is a cross-sectional view of the star-shaped filter bag of the present invention.
Figure 2:
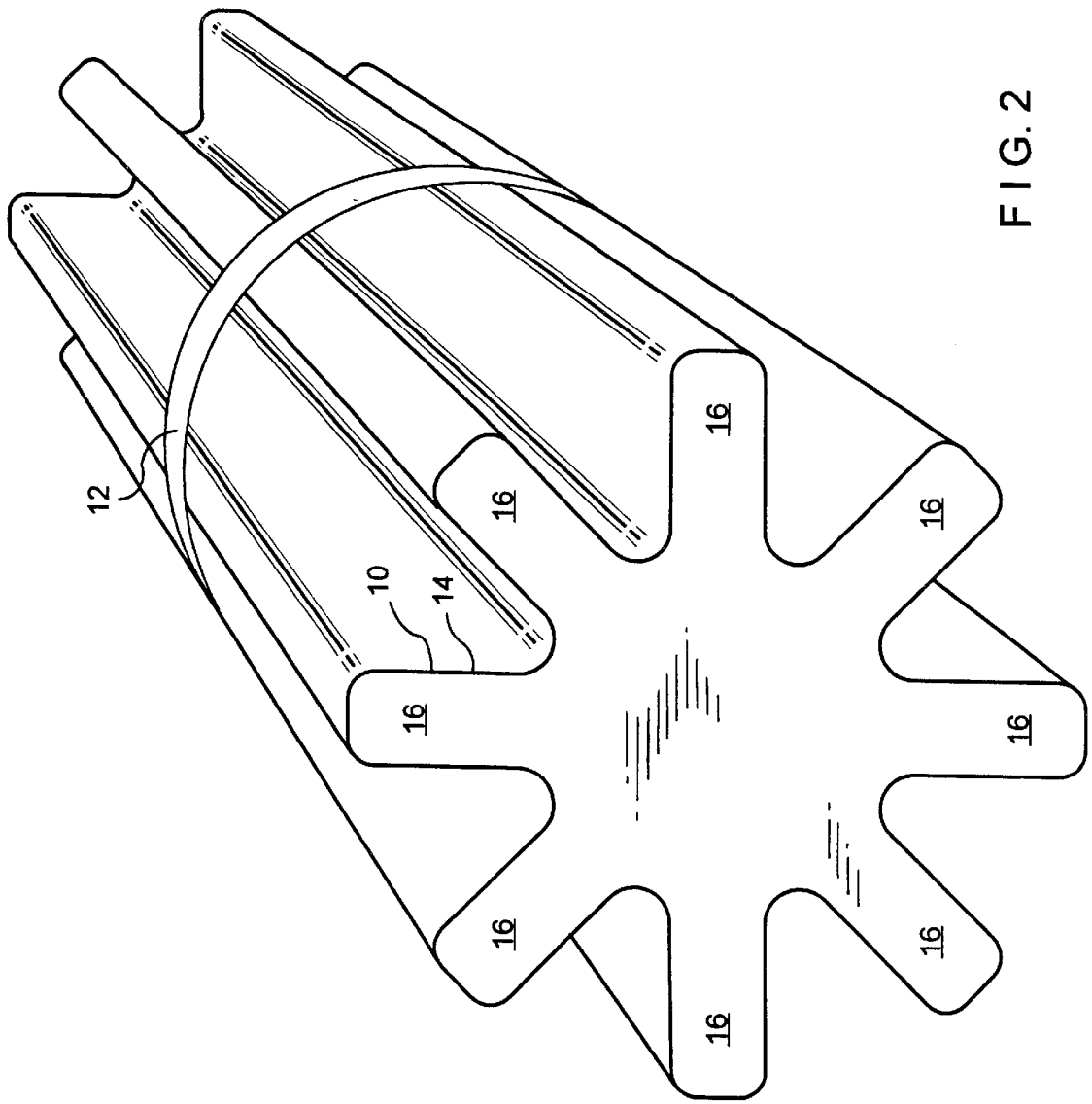
FIG. 2 is a side perspective view of the star-shaped filter bag of the present invention.

Referring now to the drawing in detail wherein like numerals indicate like elements throughout the several views, one sees that FIG. 1 is a cross-sectional view of the filter bag 10 with a circular band 12 therearound configured to fit into a cylindrical filter housing (not shown). FIG. 2 is a perspective view of the same elements as FIG. 1. As shown in FIGS. 1 and 2, filter bag 10 is comprised of filter cloth 14 which is configured so as to include circumferential undulations so as to form a star shape with a plurality of star ray undulations 16. FIG. 1 illustrates that the circumference of the filter cloth 14 is substantially greater than the circumference of the circular band 12. The outer band 12 is attached or sewn to the filter fabric circumferentially in regular intervals 13, thereby holding the filter bag permanently in a star shape.

Filter cloth 14 may be any filter cloth known in the art, such as needled felt, non-woven material, woven material, warp-knitted, circular knitted, micro-filament, fiberglass and/or woven metal.

The star shaped filter bag 10 is placed over an inner cage 18 formed by supports 19 and pairs of laterally offset longitudinal wires 26 such as is illustrated in FIG. 7. The star-shaped supports 19 of the inner cage 18 of any of the embodiments shown in FIGS. 3–6 are formed of a plurality of outwardly radially pointing star ray portions 20. Additionally, each of the embodiments of outwardly radially pointing star ray portions 20 include a laterally offset double rod configuration.

In the embodiment of support 19 illustrated in FIG. 3, four pairs 22, 23, 24, 25 of double rods are formed into V-shapes thereby forming eight star ray portions 20. The apex of each of the V-shapes are welded to a common core radius 27. Each tip of each V-shape 22, 23, 24, 25 is affixed to a longitudinal support wire 26 (typically 3 mm. stainless steel wire, shown in cross section). The laterally offset double tips at the ends of each star ray portion 20 hold the filter fabric 14 so that the filter fabric 14 will not abrade against itself.

In the embodiment of support 19 illustrated in FIG. 4, eight star ray portions 20 extend radially outward from a cylindrical core 28. Hook shaped portions 30 are formed on the distal ends of star ray portions 20 which, in turn, are affixed to two longitudinal support wires 26 (again, typically 3 mm. stainless steel wire shown in cross section) in a laterally offset double tip configuration.

In the embodiment of support 19 illustrated in FIG. 5, the eight star ray portions 20 are formed of hollow cylindrical pipes which extend radially outward from metallic ring 32 to which they are welded. Pegs (alternately, T-pins) 34 are inserted into the open hollow ends of each of the eight star ray portions 20. As illustrated in the insert to FIG. 5, each peg or T-pin 34 has an enlarged distal area 36 which is welded to two longitudinal support wires 26. This configuration allows the star cage to be delivered in parts and mounted on the site of the bag housing, where the pegs or T-pins 34 are pressed into the hollow open ends of the star ray portions 20.

The embodiment of support 19 illustrated in FIG. 6 is an extruded aluminum or plastic profile with eight star ray portions 20 connected to a cylindrical pipe 32. Each distal end of the star ray portions 20 includes an outwardly pointing C-shaped form 38 with two outwardly facing points 40, 42 which are affixed to longitudinal support wires 26 thereby achieving the laterally offset double tip configuration.

FIG. 7 is a perspective view of the star cage 18 formed by a plurality of longitudinally spaced supports 19, which can be chosen from any of the supports of FIGS. 3–6, which support longitudinal wires 26.

FIG. 8 is a plan view of the filter bag 10 which has been fitted over the star cage (element 18 not shown in FIG. 8, but the filter bag 10 conforms to the shape of the star cage 18) thereby forming star ray undulations 16. Circular bands 12 are attached to the filter bag 10. The top of filter bag 10 has a snap ring 44 with a double beaded gasket. The bottom of filter bag 10 has flat sewn folds 46. Alternately, the bottom of filter bag 10 may be clamped, tied-off or closed by insertion of a bottom circle.

The resulting filter bag achieves a filtration surface which is 1.7 to 2.2 times as large as a conventional filter of the same diameter and length. Moreover, as the resulting filter bag is stabilized by the star cage 18 and circular bands 12, the filter material can be moved more during the pulse-jet cleaning cycle, therefore it can be cleaned more easily. This reduces the compressed air and effort required in the pulse-jet cleaning cycle. Additionally, the mountable star support cage (FIG. 5) substantially facilitates and reduces the cost of transportation.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A filter element comprising:
   an interior cage comprised of a plurality of longitudinally spaced supports, each support including outwardly radially extending elements which are affixed to a plurality of pairs of laterally offset longitudinally extending wires, each of said plurality of pairs of wires forming a leg of a star pattern;
   a filter fabric held in a star form only by outer circular bands attached circumferentially to said filter fabric, said filter fabric having a circumference greater than the circumference of said interior cage, said filter fabric fitted over said interior cage and conforming to said legs of the star pattern.

2. The filter element of claim 1 wherein said outwardly radially extending elements are formed from a plurality of pairs of rods formed in a V-shape, with the apices of said V-shapes affixed around a common longitudinal center, ends of said rods being affixed to a respective wire of said plurality of pairs of laterally offset longitudinally extending wires.

3. The filter element of claim 1 wherein said plurality of radially extending elements have a proximal end at a common longitudinal center, an intermediate linear region, and a distal end with a hook-shaped portion affixed to a respective pair of said laterally offset longitudinally extending wires.

4. The filter element of claim 1 wherein said plurality of radially extending elements are formed of cylindrical pipes and have a proximal end at a common longitudinal center, an intermediate linear region, and a distal end with a T-shaped portion, wherein ends of said T-shaped portion are affixed to a respective pair of said laterally offset longitudinally extending wires.

5. The filter element of claim 1 wherein said plurality of radially extending elements are formed of cylindrical pipes and have a proximal end at a common longitudinal center, an intermediate linear region, and a distal end with an outwardly facing C-shaped portion, wherein ends of said outwardly facing C-shaped portion are affixed to a respective pair of said laterally offset longitudinally extending wires.

* * * * *